J. E. WILDMAN.
WEB FOLDING APPARATUS.
APPLICATION FILED OCT. 24, 1911.
1,108,295.
Patented Aug. 25, 1914.
5 SHEETS—SHEET 3.
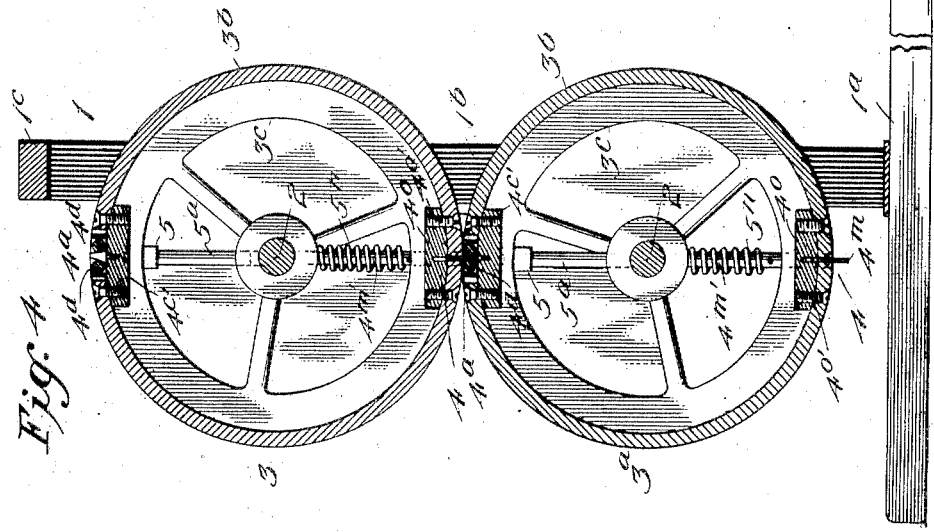
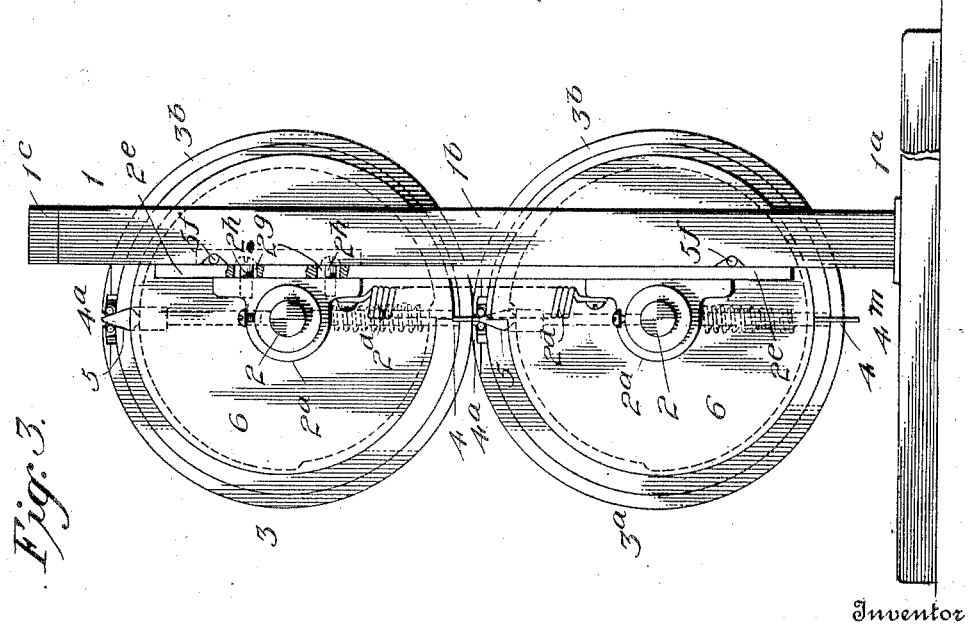

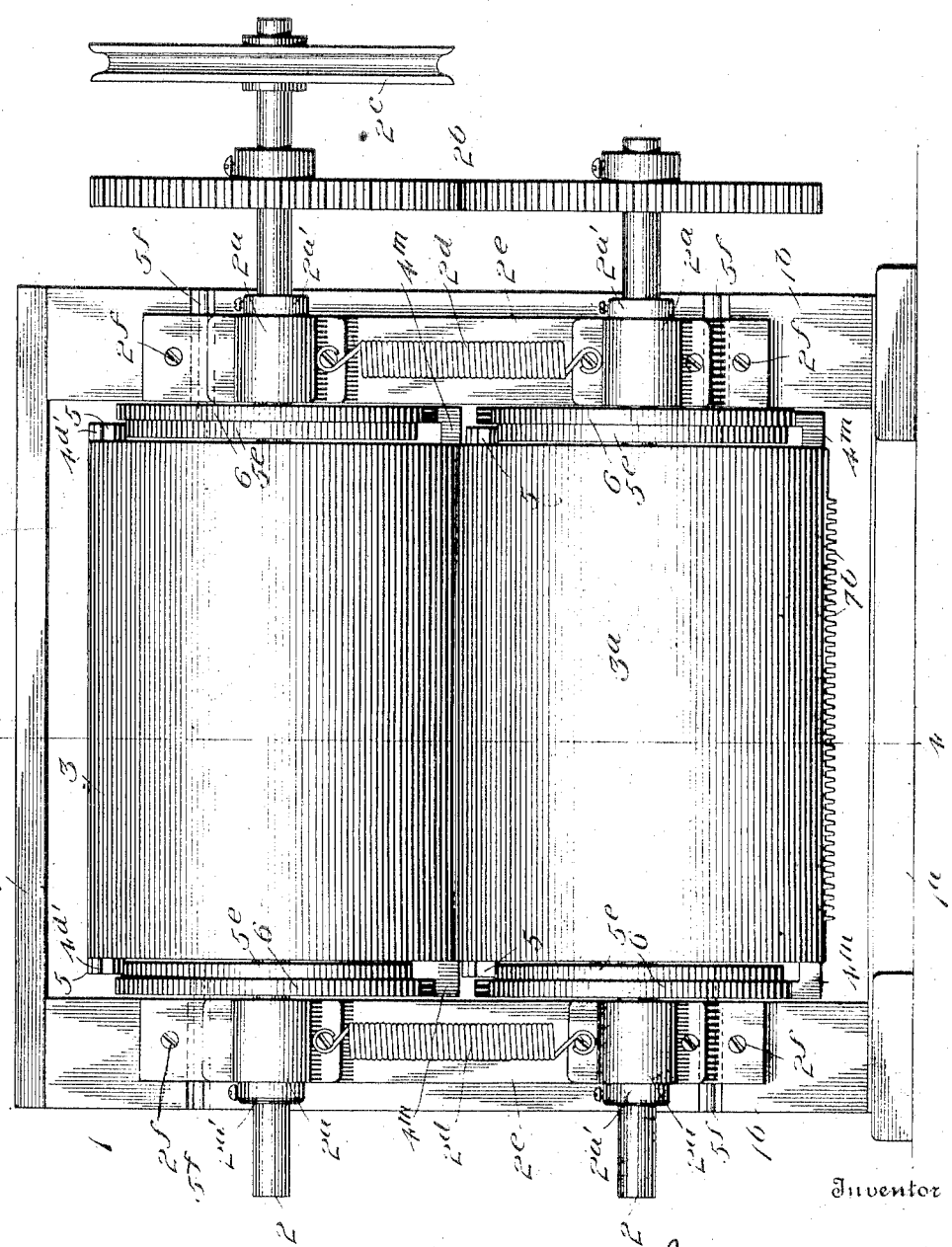

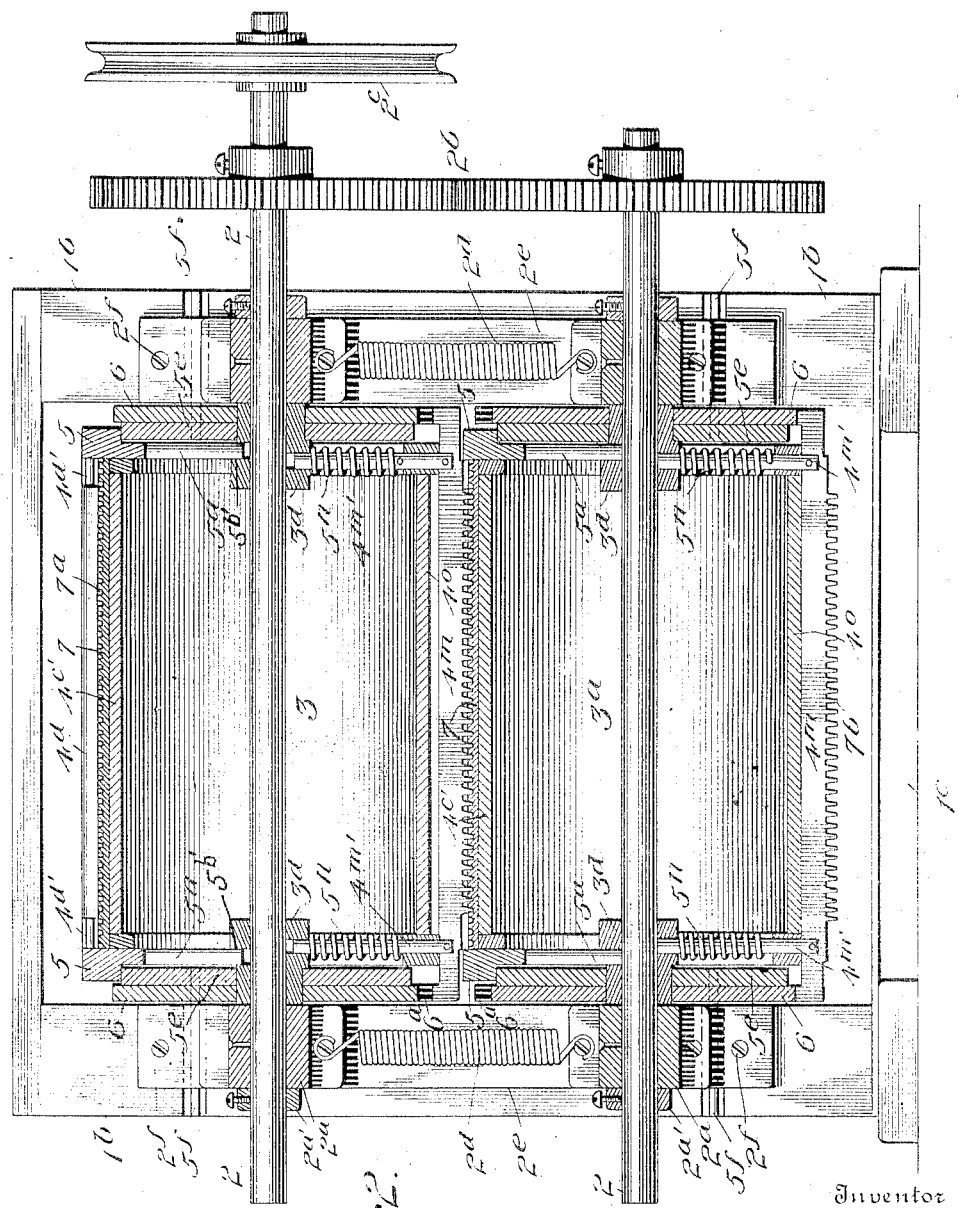

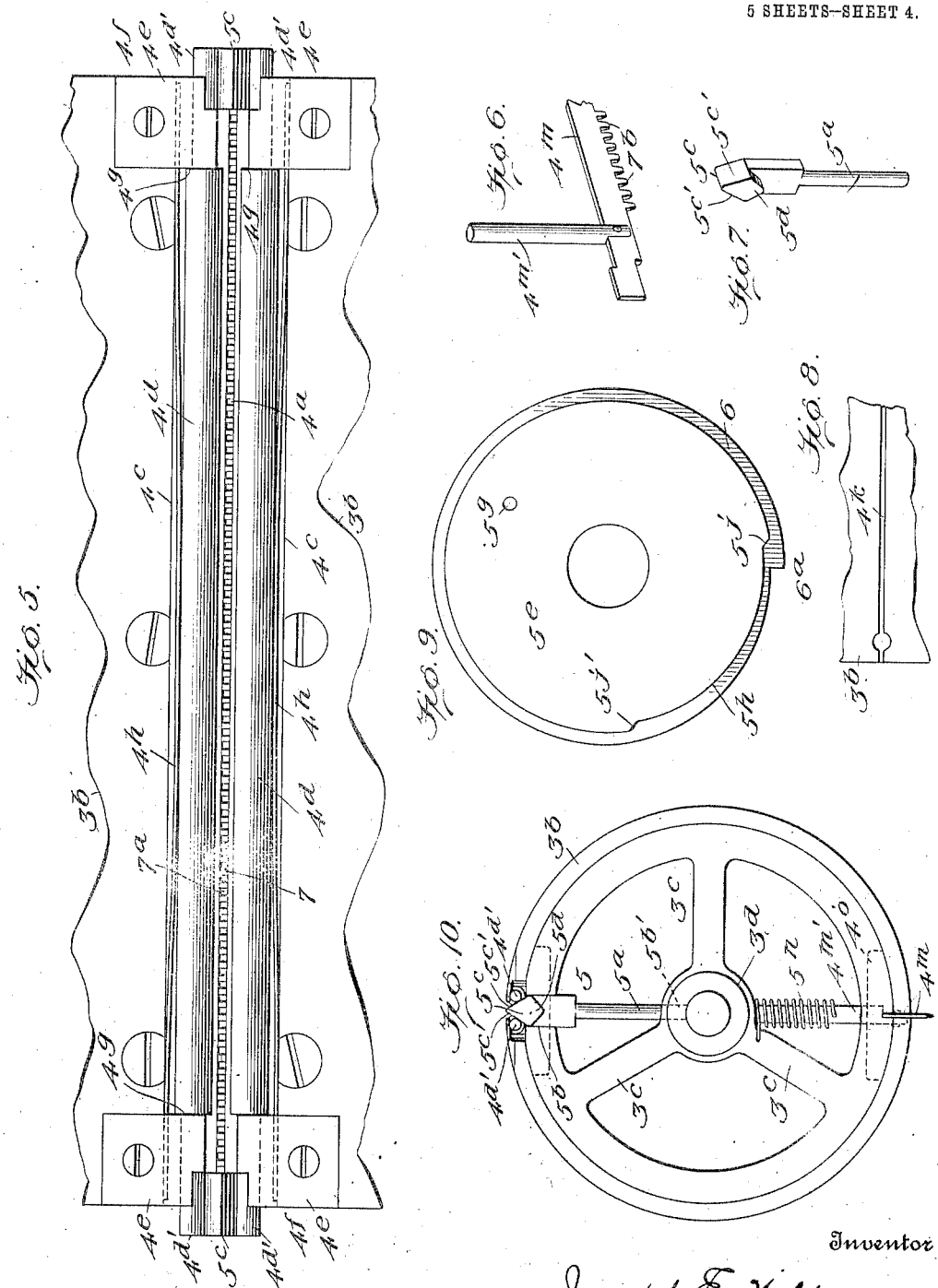

J. E. WILDMAN.
WEB FOLDING APPARATUS.
APPLICATION FILED OCT. 24, 1911.
1,108,295.
Patented Aug. 25, 1914.
5 SHEETS—SHEET 5.
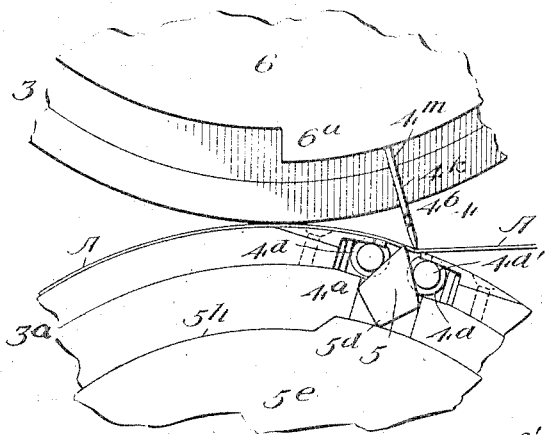
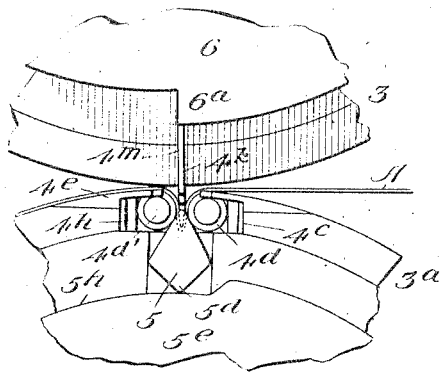
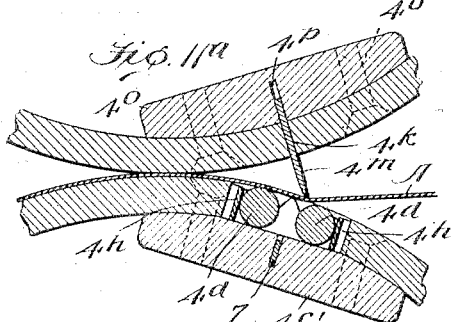
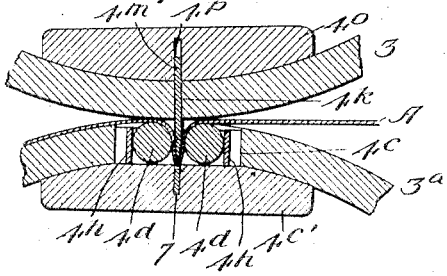
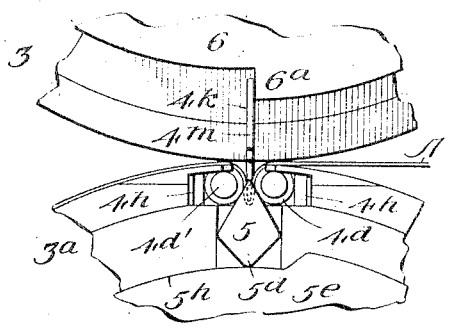
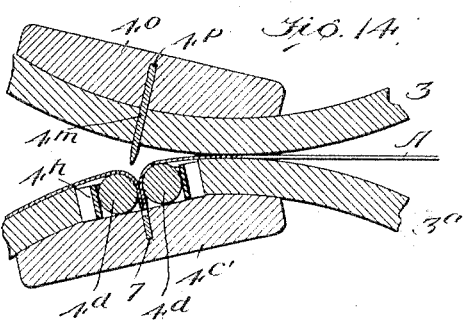
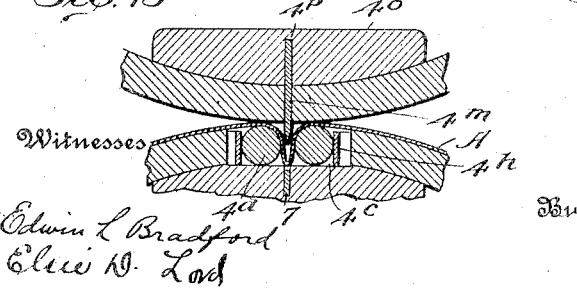
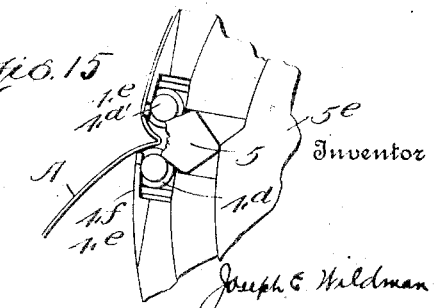
Witnesses
Edwin L. Bradford
Elsie D. Lord
Inventor
Joseph E. Wildman
By Edward R. Alexander, Attorney

UNITED STATES PATENT OFFICE.

JOSEPH E. WILDMAN, OF LANDOVER, MARYLAND, ASSIGNOR, BY MESNE ASSIGNMENTS, TO THE McCASKEY REGISTER COMPANY (INCORPORATED IN 1914), OF ALLIANCE, OHIO, A CORPORATION OF OHIO.

WEB-FOLDING APPARATUS.

1,108,295.

Specification of Letters Patent.

Patented Aug. 25, 1914.

Application filed October 24, 1911. Serial No. 656,446.

*To all whom it may concern:*

Be it known that I, JOSEPH E. WILDMAN, a citizen of the United States, residing at Landover, in the county of Prince Georges and State of Maryland, have invented certain new and useful Improvements in and Relating to Web-Folding Apparatus, of which the following is a specification.

This invention relates to apparatus for folding a strip or strips of paper on transverse lines first in one direction and then in a reverse direction, into what is commonly known as zigzag form comprising a plurality of superposed sheets or slips and adapting it for use for various purposes.

For the purpose of illustration, I have, in the accompanying drawings, shown, and herein described one form of folding apparatus embodying my invention.

Figure 1 is a front view of a folding apparatus embodying my invention. Fig. 2 is a longitudinal sectional view through the apparatus. Fig. 3 is a side elevation. Fig. 4 is a transverse section on the line 4—4 of Fig. 1. Fig. 5 is a fragmentary view illustrating in plan the paper gripping and creasing members, and the female member of the perforating devices. Figs. 6, 7 and 8 are fragmentary detail views. Fig. 9 is an elevation of two cams for operating the folding and inserting devices. Fig. 10 is a side elevation of one of the folding rollers. Figs. 11 to 15 are fragmentary views illustrating the operation of the apparatus.

In the drawings, 1 indicates as an entirety the supporting structure for the apparatus. It preferably comprises in whole or in part a base $1^a$ and a pair of spaced members $1^b$, $1^b$, which may be suitably braced at their free ends by a cross member $1^c$.

2, 2, indicate a pair of shafts, each mounted in suitable bearings $2^a$, carried by the uprights $1^b$.

$2^{a'}$ indicates collars fixed to the shafts and operating to prevent their endwise movement in the bearings $2^a$.

$2^b$ indicates a gear train, preferably consisting of two spur gears, each carried by a shaft 2. These gears are arranged to mesh with each other, whereby one shaft will be driven from the other. In carrying out the objects of the present invention, it is necessary that both shafts 2 rotate at the same speed; for that reason the gears $2^b$ are of the same size.

$2^c$ indicates a suitable pulley fixed to one of the shafts 2 and adapted to have connected to it a drive belt from some source of power.

3, $3^a$, indicate a pair of paper rollers or cylinders, each fixed to an adjacent shaft 2 and rotated thereby. As shown in the drawings, a strip or web of paper or other material A, which is to be folded, is directed between the rollers from one side and delivered on the opposite side thereof. Being positively driven, the cylinders 3, $3^a$, may serve as the means for drawing the paper from the source of supply and for delivering it in folded form onto a suitable receiving platform.

Preferably, the bearings $2^a$ for each shaft 2 are slidably mounted on the upright $1^b$ and connected together by a pair of tension springs $2^d$. The purpose and effect of this construction is to move one shaft 2 toward the other and cause a gripping action between the rollers 3, $3^a$, on the paper web and also to permit the rollers 3, $3^a$, to accommodate themselves to paper webs of different thicknesses, or variations in thickness which may occur therein.

$2^e$ indicates a supporting plate interposed between the bearing blocks $2^a$ and the upright members $1^b$, to which latter the plates are rigidly secured by screws or other devices $2^f$.

$2^g$ indicates sets of openings, one set for each bearing block $2^a$, formed in the plates $2^e$.

$2^h$ indicates devices, such as screws, extending through openings and connected with the blocks $2^a$. The screws $2^h$ have heads which engage the inner face of the plates $2^e$. As clearly shown in the drawings the openings are somewhat larger than the shanks of the bolts so that the blocks $2^a$ can move relative to the plates $2^e$. As will be understood, the screws $2^h$ are arranged to hold the blocks $2^a$ in close engagement with the plates $2^e$, but permit the blocks to move or slide so that the rollers 3, $3^a$ can accommodate the web A between them. The springs $2^d$ normally hold the cylinders together, but when the paper web is introduced between them, they may separate slightly. If preferred, only one set of bearing blocks $2^a$ need be slidably supported.

The cylinders or rollers 3, $3^a$ may be arranged one above the other in vertical plane, or side by side in a horizontal plane. In this latter arrangement the web of material to be folded will be fed to and between the rollers in a vertical direction.

Each cylinder 3, $3^a$, may comprise a body portion $3^b$ and a pair of spiders $3^c$ arranged at the opposite ends of the body portion $3^b$ and fixed thereto in any suitable manner. The spider hubs, indicated at $3^d$, may be fixed to the adjacent shaft 2 by a key or set screw, or by other means.

4 indicates sets of paper folding devices, one set operating to fold the web of paper back on itself in one direction and the other set operating to fold the web of paper back on itself in the opposite or reverse direction.

Each set of paper folding devices 4 comprises mechanism $4^a$ for gripping and creasing the paper, and mechanism $4^b$ for inserting the paper web into the gripping and creasing mechanism $4^a$. They are arranged so that one will coöperate with the other to effect a folding of the paper at the point of contact between the cylinders as the latter rotate. As shown, each cylinder 3, $3^a$ carries the gripping and creasing mechanism $4^a$ for one set of folding devices. The mechanism carried by each cylinder being arranged at diametrically opposite sides of the cylinders, the sets of folding devices will operate at the point of contact, alternately, so that for each revolution of the cylinders the web of paper A will be folded first in one direction and then in the opposite or reverse direction. By this arrangement each sheet or slip will be of the same size and of a length equal to one-half the circumference of the cylinders. Additional sets of folding devices may be provided on the cylinders; also the sets of folding devices may be arranged, relative to each other, to fold the web A on lines so that each two adjoining sheets or slips will be of different lengths.

Of the paper gripping and creasing mechanism $4^a$, $4^c$ indicates a recess formed in the surface of each cylinder 3, or $3^a$, and preferably extending longitudinally from end to end thereof. A plate $4^{c'}$, extending from end to end of each cylinder and secured to the inner surface thereof may be provided to form the bottom wall of the recess $4^c$.

$4^d$ indicates pressing and creasing devices, preferably comprising a pair of parallel arranged round rods or rollers mounted in said recess and adapted to move toward and from each other. The opposite free ends of these rollers are extended beyond the opposite ends of the adjacent cylinder, as indicated at $4^{d'}$, for a purpose which will be later described. As the outer surfaces of these rollers $4^d$ are preferably arranged substantially in the circumferential line of the adjacent cylinder 3, or $3^a$, the said gripping rollers $4^d$ are reduced at their opposite ends to permit the provision of guide and retaining means, as shown at $4^e$. These means $4^e$ may comprise pairs of detachable plates $4^f$, the ends of which overlie the rollers $4^d$, and being countersunk in the surface of the adjacent cylinder, are flush therewith. The shoulders $4^g$ formed by the reduced ends of the rollers $4^d$ preferably engage the inner walls of the guiding and retaining plates $4^f$ and are thus held against endwise movement.

$4^h$ indicates a spring interposed between each paper gripping device $4^d$ and the adjacent side wall of the recess $4^c$. The purpose of the spring $4^h$ is to press or force the pressers and creasers of each pair together to grip the paper web A when the latter is inserted between them and to crease it along a transverse line to form the fold. The paper web A is held by the grippers $4^d$ until suitable spreading mechanism 5, (which will presently be described), causes them to release it. The springs $4^h$ are preferably formed from flat strips of metal and extend substantially from end to end of the recess $4^c$ and bear against the grippers $4^d$ midway between their opposite ends in order to press both ends of each gripper toward the adjacent gripper with equal force.

The gripper spreading mechanism 5 operates first to open the grippers $4^d$ to permit the insertion of the web A between them and then to release the web after the latter has been creased or folded. Of this mechanism, $5^a$, $5^a$, indicate a pair of rods, each arranged at one end of an adjacent cylinder and adapted to slide or move radially therein. Suitable recesses or openings, indicated at $5^b$, $5^{b'}$ are preferably formed in the spiders $3^c$ and hubs $3^d$ of the cylinders for guiding and slidably supporting the rods $5^a$.

$5^c$ indicates a wedge member having oppositely inclined walls $5^{c'}$, $5^{c'}$, adapted to engage the extensions $4^{d'}$ of the grippers $4^d$ to spread them when the wedge member is moved in an outward direction. The wedge or spreader $5^c$ is normally held in a retracted position through the influence of the springs $4^h$ pressing the grippers $4^d$ together, the latter acting on the inclined walls $5^{c'}$ and operating to force the wedge $5^c$ inwardly.

$5^d$ indicates a shoulder extending laterally from the wedge $5^c$ and preferably formed integral therewith.

$5^e$ indicates a device for operating the spreaders $5^c$ at proper intervals. There are preferably two of these devices each arranged at one side of each cylinder 3, $3^a$. Each device preferably comprises a disk or circular plate loosely mounted on the adjacent shaft 2 but held stationary by a key or pin $5^f$ which is slidable in a groove between the upright $1^b$ and support $2^e$ for the bearings $2^a$, the inner end of the key or pin fitting an aperture $5^g$ formed in the plate $5^e$.

At $5^h$, each plate $5^e$ is formed in its circumferential surface with a reduced portion or recess, the opposite end walls of which are inclined and form cams $5^j$, $5^{j\prime}$ that operate the wedge at the proper time. As shown in Figs. 3, 11, 12, 13, and 16, the cam plates $5^e$ are arranged so that the cam $5^j$ is slightly forward of the contact point between the cylinders 3, $3^a$. As the cylinders rotate, the shoulders $5^d$ of the spreaders $5^c$ ride on the circumferential edge of the cam plates. In that movement of the shoulders $5^d$ on the raised portion of the cam plates, or that portion extending from the cam wall $5^{j\prime}$ around the plate to cam $5^j$, the paper grippers $4^d$ are held apart or separated from each other ready to receive the web of paper between them. As the spreaders $5^c$ approach the position opposite the point of contact, the shoulders ride down the cams $5^j$ permitting the wedges or spreaders $5^c$ to recede and retract under the influence of the springs $4^h$ acting on the grippers $4^d$. The wedges or spreaders remain in this position until the shoulders $5^d$ ride the cams $5^{j\prime}$ which latter cause the wedges or spreaders to move outwardly and effect a spreading of the grippers $4^d$ and the release of the paper web A, as will be fully explained later.

Of the inserting mechanism $4^b$, $4^k$ indicates a slot formed in the surface of each cylinder 3, $3^a$ and adapted to slidably receive a paper inserting device $4^m$. This device preferably comprises a relatively thin plate, the opposite ends of which extend laterally from the opposite ends of the adjacent cylinder to a point beyond the cam plates $5^e$, the purpose of which will presently appear.

$4^{m\prime}$ indicates a pair of guide rods for supporting each inserting device $4^m$. These rods are arranged near the opposite ends of the inserter $4^m$ and may be slidably mounted in suitable openings formed in the spiders and hubs of each adjacent cylinder and permit movement of the inserting devices $4^m$ in a radial direction. $5^n$ indicates a spring or springs preferably coiled around each supporting rod $4^{m\prime}$. One end of each spring is attached to the adjacent rod, while its opposite end is fixed to some part of the adjacent hub $3^d$. The springs normally hold the inserting devices in their innermost positions and are placed under tension when the latter are moved outwardly, radially. $4^o$ indicates a plate which is arranged within and extends from end to end of each of the cylinders. This plate is formed with a recess $4^p$ that registers with the slot $4^k$, to receive and assist in guiding and supporting the inserter $4^m$. The bottom of the recess $4^p$ may serve as a stop to limit the inward movement of the inserting device $4^m$. The plate $4^o$ is preferably secured to the cylinder by screws $4^{o\prime}$.

As shown in the drawings, the recess $4^e$ and slot $4^k$ extend entirely through the wall of each cylinder 3 or $3^a$, and hence separate it into two semi-circular sections. It will be seen, however, that the plates $4^{e\prime}$ and $4^{o\prime}$ rigidly connect the semicircular sections together and thus form the cylinder.

6 indicates a stationary plate loosely mounted upon each shaft 2 at each end of each cylinder 3, and $3^a$. The circumferential edges of the plates 6 are cam shaped and provided with shoulder $6^a$. The cam plate 6 may be made separate from the cam disk $5^e$ but if preferably formed with an opening that registers with the opening $5^g$ to receive the key or pin $5^f$ whereby it will be fixed in position.

As will be clearly understood from Figs. 1, 2, 3, 11, 12 and 13, the extended ends of the inserting device $4^m$ ride on the cam $6^a$ which operates to slide or move the inserter $4^m$ outwardly, but when the ends pass the shoulders $6^a$, the latter permit the ends to recede quickly under the influence of the springs $5^n$.

In the operation of my apparatus it will be seen that the gripping and creasing mechanism $4^a$ carried by one cylinder and the inserting mechanism $4^b$ carried by the other cylinder approach the point of contact between the cylinders simultaneously and then coöperate to fold the paper web. The paper web A having been first introduced between the cylinders by hand, the apparatus is connected with the source of power to rotate the cylinders. Suitable guide devices (not shown) may be provided for feeding the web continuously to the cylinders and for delivering it upon a platform after it has been folded, but the rotation of the cylinders and their functional engagement with the web may be relied on, if desired, to draw the web from the supply roll. During the approach of the inserting device $4^m$ to the operating position it is held or forced outwardly by the cam 6; at the same time the grippers $4^d$ are separated from each other, by the raised portion of the cam disk $5^e$ to receive the inserting device $4^m$. This position of the parts is illustrated in Figs. 11 and $11^a$. As the inserters $4^m$ and grippers $4^d$ continue to move nearer together the inserter projects into the space between the grippers $4^d$ and inserts the paper web between them. Following this operation, the shoulder $5^d$ riding down the cam $5^j$ permits the wedges $5^c$ to recede and the grippers $4^d$ to engage the paper web. This position of the parts is represented in Figs. 12 and $12^a$ where the inserter $4^m$ is shown inserting the paper web down between the grippers and is about to recede therefrom. As shown in the drawings, the cam 5$^j$ is arranged to permit the grippers 4$^d$ to operate before the inserter recedes to its innermost position; also the shoulder 6$^a$ is preferably arranged substantially in line with the point of contact between cylinders so that the inserter 4$^m$ may be held in its outermost or extended position until the point of contact is reached and the inserting mechanism and creasing mechanism begin to move from each other. By this construction and operation the web will be forced completely down between the grippers 4$^d$ and permit the latter to grip the web with equal force on opposite sides of the inserter before the latter recedes. Figs. 13 and 13$^a$ illustrate the position of the parts, immediately after the inserting device 4$^m$ has passed the shoulder 6$^a$ and receded from between the grippers 4$^d$. The latter now grip the paper web between them and complete the crease or fold on a transverse line. When the shoulders 5$^d$ reach the end of the recess 5$^h$ they ride up the cams 5$^{j'}$ and cause the wedges or spreaders 5$^e$ to separate the grippers 4$^d$, whereupon the paper web A will be released and allowed to fall upon the platform. The position of the parts immediately following the release of the paper web is clearly shown in Fig. 15.

In the folding operation just described, the steps of which are illustrated in Figs. 12 to 15 inclusive, the inserting mechanism was carried by the cylinder 3 and the gripping and creasing mechanism was carried by the cylinder 3$^a$. When the cylinders 3, 3$^a$ have made one-half of a complete revolution the alternate inserting and gripping and creasing mechanisms will coöperate with each other at the point of contact, and being carried by the lower and upper cylinders, respectively, the web A will be folded reversely to that folding operation which has just been described. Thus it will be seen that by the arrangement of the sets of mechanism, the web of paper will be folded first in one direction and then in the reverse direction for each complete revolution of the cylinders.

I prefer to weaken the web of paper along the lines of fold in order to permit the ready detachment of each sheet or slip one from another. For this purpose I provide a pair of coöperating devices, which operate to perforate the paper along the folded line at the time the inserting mechanism is operating on the paper web and inserting it between the grippers 4$^d$. These devices may comprise a plate 7, which is countersunk in the bottom wall of each recess 4$^c$ and formed with a series of depressions or openings 7$^a$, and a series of projections or teeth 7$^b$ carried by and preferably formed integral with each inserting device 4$^m$ and arranged to enter said depressions. As shown in the drawings, the plate 7 extends from end to end of the recess 4$^c$ and is arranged substantially midway between its side walls. The teeth 7$^b$ project from the free edge of the inserter 4$^m$ and are thus carried in between the grippers 4$^d$ when the latter are separated to receive the inserter. As the inserting mechanism and the paper gripping mechanism move into coöperative relation, the projections 7$^b$ pierce the paper web and enter the depressions 7$^a$. The effect of this operation will be to form a series of perforations along each line of fold and thus weaken the paper, whereby each section or slip can be easily separated from each other. As the grippers 4$^d$ engage and grip the paper web between them, it will be prevented from clinging to the teeth 7$^b$ and being withdrawn by said teeth from between the grippers by the inserting device 4$^m$.

When it is desired to weaken the paper along each alternate line of fold, the teeth 7$^b$ on one inserting device may be omitted.

My apparatus may be connected with or attached to a printing mechanism by means of which the web is suitably printed before it is folded. By such an arrangement the inking rolls of the printing mechanism do not engage with the folding or perforating devices and become damaged thereby.

To those skilled in the art of making apparatus of the class described, many alterations in construction and widely differing embodiments and applications of my invention will suggest themselves, without departing from the spirit and scope thereof.

My disclosures and the description herein are purely illustrative, and are not intended to be in any sense limiting.

What I claim is:

1. In a paper folding apparatus, the combination with two rollers arranged to receive a web of paper between them, of sets of devices carried by said rollers for folding the web of paper in opposite directions, each set of devices including a pair of reciprocating roller paper gripping members, a movable inserter, means for controlling the opening and closing of the paper gripping members, and means for controlling the movements of the inserter to insert the paper web between the paper gripping members when the latter are opened.

2. In a paper folding apparatus, the combination with two rollers arranged to receive a web of paper between them, of sets of devices carried by said rollers for folding the web of paper in opposite directions, each set of devices including a pair of reciprocating roller paper gripping members, a movable inserter, means arranged at one side of one roller for controlling the opening and closing of said paper gripping members, and means arranged at one side of the other roller for controlling the movements of the inserter to insert the paper web between the paper gripping members when the latter are opened.

3. In a paper folding apparatus, the combination with two rollers arranged to receive a web of paper between them, of sets of devices carried by said rollers for folding the web of paper in opposite directions, each set of devices including a pair of reciprocating roller paper gripping members, a movable inserter, a cam arranged at one side of one roller for controlling the movements of the paper gripping members, and a cam arranged at one side of the other roller for controlling the movements of the inserter to insert the paper web between the paper gripping members when the latter are opened, the last mentioned cam being provided with a shoulder to permit the receding of the inserter after the closing of the gripping members.

4. In a paper folding apparatus, the combination with two rollers arranged to receive between them a web of paper, of a pair of stationary cams arranged at one side of each roller, sets of devices carried by said rollers for folding the web of paper in opposite directions along transverse lines, each set of devices comprising an inserter carried by one roller and extending laterally at one end and arranged to ride on one of said stationary cams, a pair of paper gripping members carried by the other roller for gripping and creasing the web of paper, said members being extended laterally beyond one end of the adjacent roller, and a device interposed between the extended ends of the gripping members and the other of said stationary cams and operated by the latter for controlling the movement of said gripping members.

5. In a paper folding apparatus, the combination with two rollers arranged to receive between them a web of paper, of a stationary cam arranged at one side of each roller, sets of devices carried by said rollers for folding the web of paper in opposite directions along transverse lines, each set of devices comprising an inserter carried by one roller, a pair of paper gripping members carried by the other roller and arranged to move simultaneously toward and from each other, for gripping and creasing the web of paper, said members being extended laterally beyond one end of the adjacent roller, and a slidable device interposed between the extended ends of the gripping members and the stationary cam and operated by the latter for controlling the movement of said gripping members.

6. In a paper folding apparatus, the combination with two rollers arranged to receive between them a web of paper, sets of devices carried by said rollers for folding the web of paper in opposite directions along transverse lines, each set of devices comprising an inserter carried by one roller, a pair of paper gripping members carried by the other roller for gripping and creasing the web of paper and arranged to move simultaneously toward and from each other, said members being extended laterally beyond one end of the adjacent roller, a radially slidable device arranged to engage the extended ends of said gripping members, and means including a stationary cam for actuating the slidable device to open and close said gripping members at predetermined points.

7. In a paper folding apparatus, the combination with a pair of rollers arranged to receive a web of paper between them, and means for rotating said rollers, of sets of devices for folding the web of paper in opposite directions alternately, each of said sets of devices comprising an inserter, a radially movable member, a pair of paper gripping members movable toward and from each other in directions at substantially right angles to the direction of movement of said movable member, springs for operating said gripping members in one direction simultaneously, and a cam operating through said movable member to move the gripping members in the opposite direction.

8. In an apparatus of the character described, the combination with a pair of rollers arranged to receive a web of paper between them, each of said rollers being formed with a recess, of sets of devices for folding the web of paper alternately in opposite directions, each of said sets of devices comprising a pair of paper gripping members carried by one of said rollers and a paper inserter carried by the other of said rollers, each of said recesses being formed with a plurality of openings arranged between the gripping members and each of the paper inserters being provided with a series of teeth arranged to project into said openings to perforate the paper along the line of fold.

9. In an apparatus of the character described, the combination with a pair of rollers arranged to receive a web of paper between them, each of said rollers being formed with a recess, of sets of devices for folding the web of paper alternately in opposite directions, each of said sets of devices comprising a pair of paper gripping members mounted in the recess of one of said rollers and a paper inserter carried by the other roller, the bottom walls of each of said recesses being formed with a series of openings, and teeth carried by each inserter arranged to project into the openings to perforate the paper along the line of fold.

10. In an apparatus of the character described, the combination with a pair of rollers arranged to receive a web of paper between them, each of said rollers being formed with a recess, of sets of devices for folding the web of paper alternately in opposite directions, each of said sets of devices comprising a pair of paper gripping members carried by one of said rollers, a paper inserter carried by the other of said rollers and a spring tending to move the inserter inwardly, each of said recesses being formed with a plurality of openings arranged between the gripping members and each of the paper inserters being provided with a series of teeth arranged to project into said openings to perforate the paper along the line of fold, and a cam for moving the inserter outwardly to cause the teeth to project into the openings, said cam being formed with a shoulder permitting the inserter to move inwardly after the teeth have perforated the paper.

11. In an apparatus of the character described, the combination with a pair of rollers arranged to receive a web of paper between them, each of said rollers being formed with a recess, of sets of devices for folding the web of paper alternately in opposite directions, each of said sets of devices comprising a pair of paper gripping members carried by one of said rollers, a paper inserter carried by the other of said rollers and a spring tending to move the inserter inwardly, each of said recesses being formed with a plurality of openings arranged between the gripping members and each of the paper inserters being provided with a series of teeth arranged to project into said openings to perforate the paper along the line of fold, a cam for moving the inserter outwardly to cause the teeth to project into the openings, said cam being formed with a shoulder permitting the inserter to move inwardly after the teeth have perforated the paper, and means for operating the gripping members before the inserter moves inwardly.

12. In a paper folding apparatus, the combination with a pair of rotatable members arranged to receive a web of paper between them, and means for rotating said members, each of said members being formed with a longitudinal recess having bottom and side walls, of sets of devices for folding the web of paper in opposite directions alternately, each of said sets of devices comprising an inserter, a pair of paper gripping rollers movable toward and from each other on the bottom wall of the recess, means for retaining said rollers in said recess and permitting them to move toward and from each other, springs for operating said gripping rollers in one direction simultaneously, a wedge for moving said gripping rollers in the opposite direction, and means for controlling said wedge.

13. In a folding apparatus, the combination with a pair of driven rotatable members arranged to receive between them a web of material to be folded, each of said members being formed with a recess, a pair of rollers mounted in each recess and movable toward and from each other, springs for pressing the rollers together, the said rollers being reduced at their opposite end to form shoulders, devices carried by the members engaging the reduced ends and shoulders to support the rollers thereon and to prevent endwise movement of the rollers, an inserter carried by each member and arranged to insert the web between the rollers of the other member, means arranged to operate the said rollers, first to separate them to receive the inserter and web and then to grip and crease the said web, and means for operating the creasing devices to release the web therefrom.

14. In a paper folding apparatus, the combination with a pair of rollers arranged to receive between them a web of paper, of sets of devices carried by the rollers for folding the web in opposite directions alternately, each of said folding devices including a pair of paper gripping and creasing members, springs for pressing said members together, a wedge for separating said gripping and creasing members, and means for operating said wedge in one direction.

15. In a paper folding apparatus, the combination with a pair of rollers arranged to receive between them a web of paper, of sets of devices carried by said rollers for folding the web in opposite directions alternately, each of said folding devices including a pair of paper gripping and creasing members, springs for pressing said members together, a wedge for separating said gripping and creasing members, and means for operating said wedge in one direction, the said wedge being actuated in the opposite direction by said springs.

16. In a paper folding apparatus, the combination with a pair of rollers arranged to receive between them a web of paper, of sets of devices carried by said rollers for folding the web in opposite directions alternately, each of said folding devices including a pair of paper gripping and creasing members, springs for pressing said members together, a wedge for separating said gripping and creasing members, and cam devices operating to control the said wedge.

17. In a folding apparatus, the combination with a pair of driven rollers arranged to receive between them a web of material, of sets of devices for folding the material in opposite directions alternately, each set of folding devices including a pair of creasing members carried by and extending beyond one end of each roller, means tending to force the creasing members together, radially movable devices for spreading the said creasing members, and means for operating said spreading devices at predetermined intervals.

18. In a folding apparatus, the combination with a pair of driven rollers arranged to receive between them a web of material, of sets of devices for folding the material in opposite directions alternately, each set of folding devices including a pair of creasing members carried by and extending beyond one end of each roller, means tending to force the creasing members together, radially movable wedge shaped devices for spreading the said creasing members, and means for operating said spreading devices at predetermined intervals.

19. In a folding apparatus, the combination with a pair of driven rollers arranged to receive between them a web of material, of sets of devices for folding the material in opposite directions alternately, each set of folding devices including a pair of creasing members carried by and extending beyond one end of each roller, means tending to force the creasing members together, radially movable devices for spreading the said creasing members, means for operating said spreading devices at predetermined intervals, and means for inserting the web of material between said creasing members.

In testimony whereof I affix my signature, in the presence of two witnesses.

JOSEPH E. WILDMAN.

Witnesses:
GEO. B. PITTS,
L. C. BRADY.